United States Patent [19]
Brandman

[11] Patent Number: 5,974,144
[45] Date of Patent: Oct. 26, 1999

[54] SYSTEM FOR ENCRYPTION OF PARTITIONED DATA BLOCKS UTILIZING PUBLIC KEY METHODS AND RANDOM NUMBERS

[75] Inventor: Nahum Brandman, Haifa, Israel

[73] Assignee: CipherActive Ltd., Israel

[21] Appl. No.: 09/030,565

[22] Filed: Feb. 25, 1998

[51] Int. Cl.[6] ................................................ H04N 7/167
[52] U.S. Cl. .............................................. 380/10; 380/37
[58] Field of Search ................................ 380/44, 30, 37, 380/10, 28

[56] References Cited

U.S. PATENT DOCUMENTS

| | | | |
|---|---|---|---|
| 5,003,597 | 3/1991 | Merkle | 380/37 |
| 5,200,999 | 4/1993 | Matyas et al. | 380/25 |
| 5,201,000 | 4/1993 | Matyas et al. | 380/30 |
| 5,231,667 | 7/1993 | Kojima | 380/28 |
| 5,261,003 | 11/1993 | Matsui | 380/50 |
| 5,351,299 | 9/1994 | Matsuzaki et al. | 380/37 |
| 5,425,103 | 6/1995 | Shaw | 380/44 |
| 5,488,661 | 1/1996 | Matsui | 380/29 |
| 5,577,123 | 11/1996 | Shimada | 380/30 |
| 5,608,801 | 3/1997 | Aiello et al. | 380/46 |
| 5,621,799 | 4/1997 | Katta et al. | 380/48 |
| 5,675,653 | 10/1997 | Nelson, Jr. | 380/28 |
| 5,729,609 | 3/1998 | Moulart et al. | 380/27 |
| 5,799,089 | 8/1998 | Kuhn et al. | 380/37 |
| 5,825,886 | 10/1998 | Adams et al. | 380/28 |
| 5,870,470 | 2/1999 | Johnson et al. | 380/6 |

*Primary Examiner*—Gail O. Hayes
*Assistant Examiner*—Anthony DiLorenzo
*Attorney, Agent, or Firm*—David Newman Chartered

[57] ABSTRACT

A method for encryption wide-bandwidth video, using a first processor for encrypting the video and a second processor for decrypting the video. Data is taken in blocks. A block of data is scrambled to generate scrambled data, then partitioned into a first portion and a second portion. A global key is generated at the first processor and the second processor, using public key technology. At the first processor, the global key is exclusively-ORed with the first portion, thereby generating a encrypted second portion. At the first processor, a random number is generated from the first portion and exclusively-ORed with the second portion to generate an encrypted second portion. At the second processor, the global key is exclusively-ORed with the encrypted first portion. At the second processor, the random number is recovered from the decrypted first portion and exclusively-ORed with the encrypted second portion to decrypt it. The scrambled data are descrambled, thereby recovering the data.

22 Claims, 3 Drawing Sheets

SYSTEM FOR ENCRYPTION OF PARTITIONED DATA BLOCKS UTILIZING PUBLIC KEY METHODS AND RANDOM NUMBERS

RELATED PATENTS

This invention is related to U.S. Pat. No. 4,200,770 entitled "CRYPTOGRAPHIC APPARATUS AND METHOD", to W. Diffie and M. E. Hellman, Apr. 29, 1980; U.S. Pat. No. 4,405,829 entitled "CRYPTOGRAPHIC COMMUNICATIONS SYSTEM AND METHOD", to R. Rivest, A. Shamir and L. Adleman, Sep. 20, 1983; and, U.S. Pat. No. 4,424,414, entitled "EXPONENTIATION CRYPTOGRAPHIC APPARATUS AND METHOD", to S. C. Pohlig and M. E. Hellman, which are all incorporated herein by reference.

BACKGROUND OF THE INVENTION

This invention relates to encryption, and more particularly to an efficient method for encrypting wide bandwidth video, with the security of public key technology.

DESCRIPTION OF THE RELEVANT ART

Advances in modern state-of-the-art telecommunications technologies including personal computers, local area networks, distributed data bases, pocket radio, satellite teleconferencing, electronic mail, and electronic funds transfer, have stimulated an increased awareness of the vulnerability of communications links to interception and of the susceptibility of databases to exploitation and tampering. This same telecommunications revolution has made widespread the availability of technology for implementing techniques which can provide authenticated communications that also can be made secure against eavesdropping or tampering.

Primary users of a secure network of communicators include the banking community which has a need for ensuring that funds, electronically transferred, are sent correctly: a message authentication problem. Similarly, the stocks and securities community, which operates on a computer network, has a requirement that the buying and selling of stocks be authentically sent to and from the correct person.

Communicators increasingly are becoming aware of communications privacy and security. A technical solution, for providing security against both eavesdropping and the injection of illegitimate messages, includes cryptography. Two generic approaches to key distribution are classical cryptographic techniques and public key cryptographic techniques. Classical cryptography requires that, for ensuring secure communications, communicators must have keys that are identical. The encryption key is used to "lock" or secure the messages and a receiver must have an identical key to "unlock" or decrypt the messages. A problem arises with key distribution in a large network of communicators who wish to communicate with each other securely.

A major problem with classical cryptographic techniques is key distribution in a large network which requires n(n−1)/2 keys for n nodes. For example, a message, M, which is encrypted with an encryption key $E_A$, into a cipher text, C, requires that the key be distributed over a private channel to the receiver. This requirement includes the generating, storing, distributing, destructing and archiving of key variables which are essential elements of encipherment. Typically, a courier is responsible for distributing the keys over the private channel. For a large network of communicators, this requires a courier to distribute the key to many users. Further, if all communicators in the network were using the same key, and if the key were compromised by any one communicator, then the whole network is compromised.

The Data Encryption Standard (DES) could be used with a commonly generated global key, where the global key is generated using public key cryptographic techniques. The DES implemented in software is inefficient due to its complicated algorithm, and time consuming in performing calculations for each block of data. For wide bandwidth data, as would be used with video, the time requirement with DES is undesirable.

The advent of inexpensive electronics hardware has facilitated means for providing the security of communications. In computer communications networks in particular, public key cryptography, which may be viewed as a multiple access cryptographic technique, provides a relatively inexpensive means for distributing keys among communicators and ensuring communications privacy and message authentication in comparison to conventional cryptographic techniques.

SUMMARY OF THE INVENTION

A general object of the invention is encrypting wide bandwidth, as might be used for video, with an efficient method, while achieving the level of security attributed to public key systems.

According to the present invention, as embodied and broadly described herein, a method, using a first processor located at a first user and a second processor located at a second user, for encrypting and decrypting data is provided. The data have a plurality of blocks. The first user has a first secret key, and a first public key generated from the first secret key. The second user has a second secret key, and a second public key generated from the second secret key.

For secure communications between the first user and the second user, the method comprises the steps, at the first user using the first processor, of generating a global key from the second public key and the first secret key and, for each block of data, scrambling the block of data, thereby generating a block of scrambled data. The method includes partitioning the block of scrambled data into a first portion and a second portion, thereby generating a block of scrambled data having a first portion and a second portion. The method includes the step of generating a random number, using an algorithm in the first processor, from the first portion of the block of scrambled data. The method further includes the steps of combining the second portion of the block of scrambled data with the random number to generate a scrambled second portion, and combining the global key with the first portion of the block of scrambled data to generate a scrambled first portion, thereby generating encrypted data comprising the scrambled second portion concatenated with the scrambled first portion. The encrypted data are sent from the first processor to the second processor.

At the second user, using the second processor, the method comprises the steps of generating the global key from the first public key and the second secret key, and combining the global key with the scrambled first portion to generate the first portion. The random number is generated from the first portion. The method further includes the steps of combining the random number with the scrambled second portion, thereby generating the second portion, and descrambling the block of scrambled data comprising the first portion and the second portion, thereby generating the block of data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings.

The present invention provides a new and novel method for encrypting broadband data to be communicated between a first user and a second user. The first user has a first processor and the second user has a second processor. The data are assumed to have a plurality of blocks. The first user has a first secret key and a first public key; the first public key is generated from the first secret key. The second user has a second secret key and a second public key; the second public key is generated from the second secret key. The first public key and the second public key are generally available to all users. The first secret key is secret and known to the first user, but not to other users. The second secret key is secret and known to the second user, but not to other users.

Figure 1:
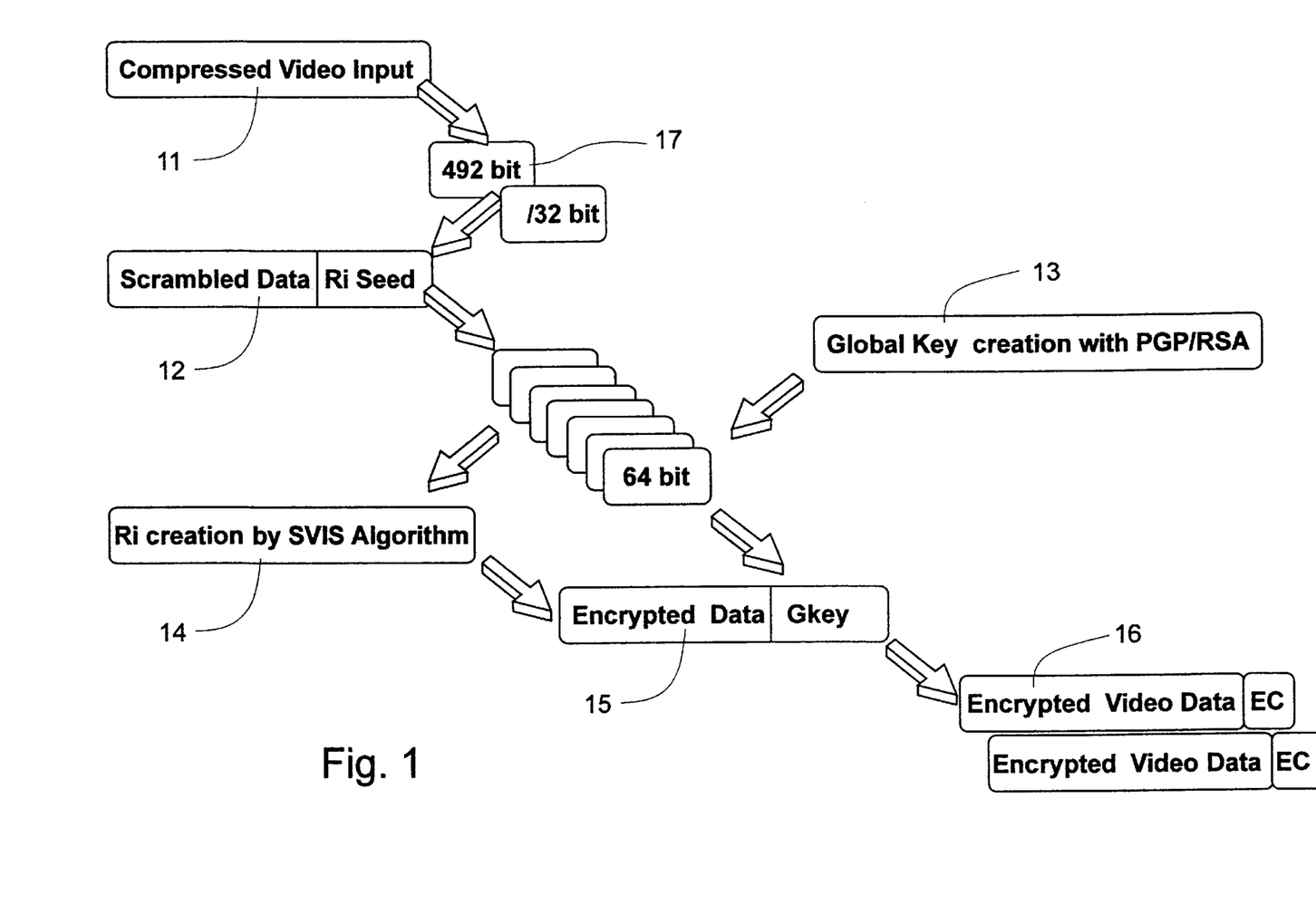
FIG. 1 is a video encryption block diagram.

Referring to FIG. 1, the data typically are compressed 11 at the video input. At the first user, using the first processor, the method comprises the steps of generating 13 a global key from the second public key and the first secret key. What are generally known as public key algorithms or technology, are used to generate a respective public key from a secret key. Public key algorithms are disclosed in U.S. Pat. No. 4,200, 770, by way of example. The global key need not be generated using a public key algorithm. Instead, the global key may be distributed or hand delivered by a courier. Using a public key algorithm, however, is a preferred method for obtaining a global key at each user.

Figure 2:
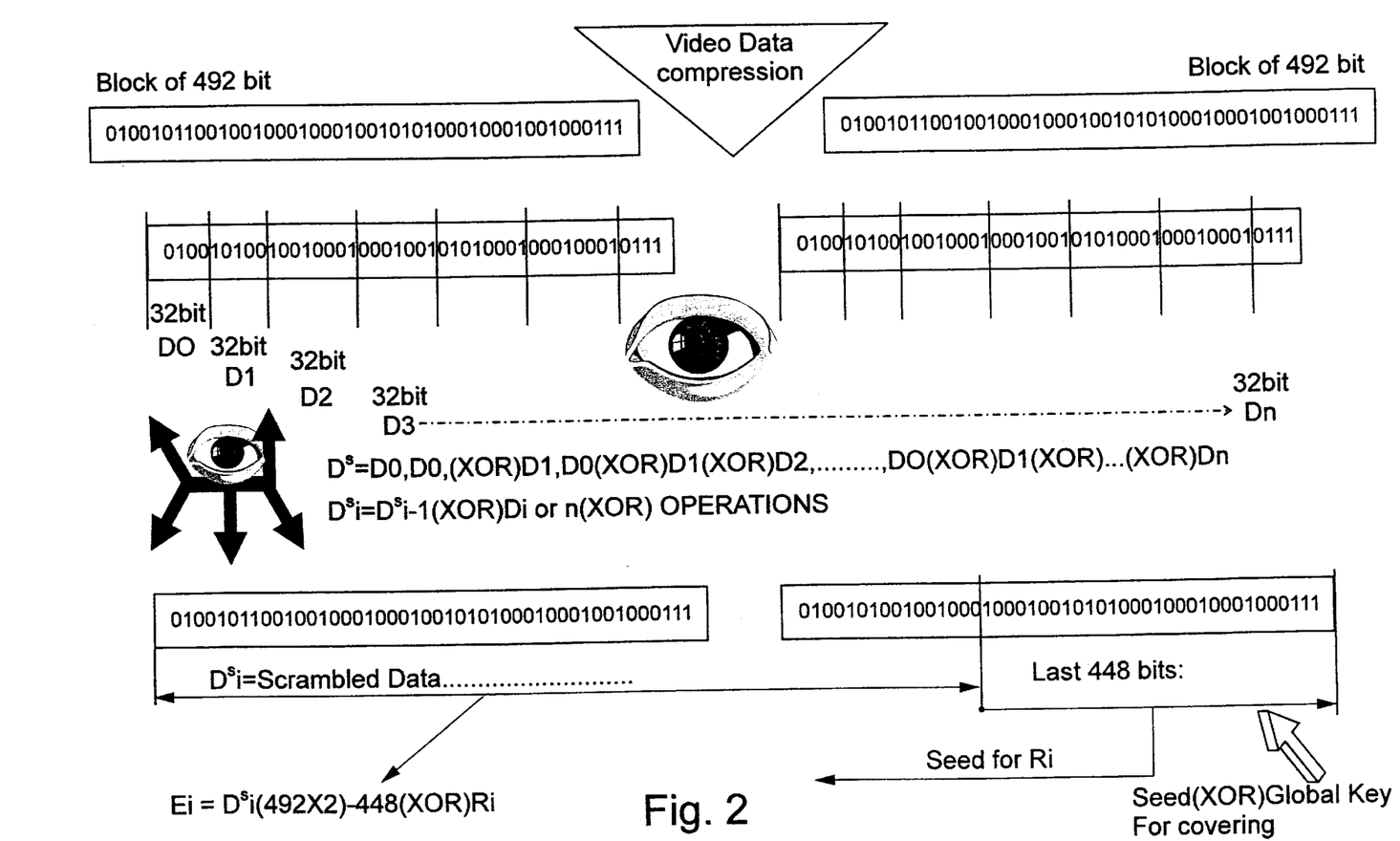
FIG. 2 illustrates random seed and global key creation.

The method includes scrambling 12, for each block of data and using the first processor, a block of the data. This produces a block of scrambled data. Many algorithms may be used for the scrambling. For example, each block is assumed to have a multiplicity of sub-blocks. The multiplicity of sub-blocks, as shown in FIG. 1, for a block of data having 512 bits, may be 16 sub-blocks of 32 bits per sub-block. The multiplicity of sub-blocks (D0, D1, D2 ...), as shown in FIG. 2, can be exclusively-XORed to generate a block of scrambled data. The first sub-block of data is not altered. The second sub-block of data is exclusively-XORed with the first sub-block of data. The third sub-block of data is exclusively-XORed with the first sub-block of data and the second sub-block of data, or equivalently, the third sub-block is exclusively-XORed with the previously exclusively-XORed result. The subsequent sub-blocks of data are similarly generated.

The scrambling need not be accomplished using sub-blocks of data and, alternatively, may be performed on a bit-by-bit basis. A key to the scrambling is that the mapping of the block of data to the block of scrambled data is one-to-one, or substantially one-to-one. With the one-to-one requirement being met, the scrambling may use a hashing function, or even a simple cipher, such as a Caesar cipher. If a simple cipher were used for the scrambling, then the key to the simple cipher may be passed in the header. The key for the simple cipher need not be secret.

The block of scrambled data is partitioned into a first portion and a second portion. This generates a block of scrambled data having the first portion and the second portion. In FIG. 2, the first portion is shown as the last 448 bits.

The method further includes generating 14 a random number, using an algorithm in the first processor, from the first portion of the block of scrambled data. A random number is generated each time a block of data is inputted into the processor. Thus, since the first portion can have different number or a different data, the random number is different for each block of data.

Figure 3:
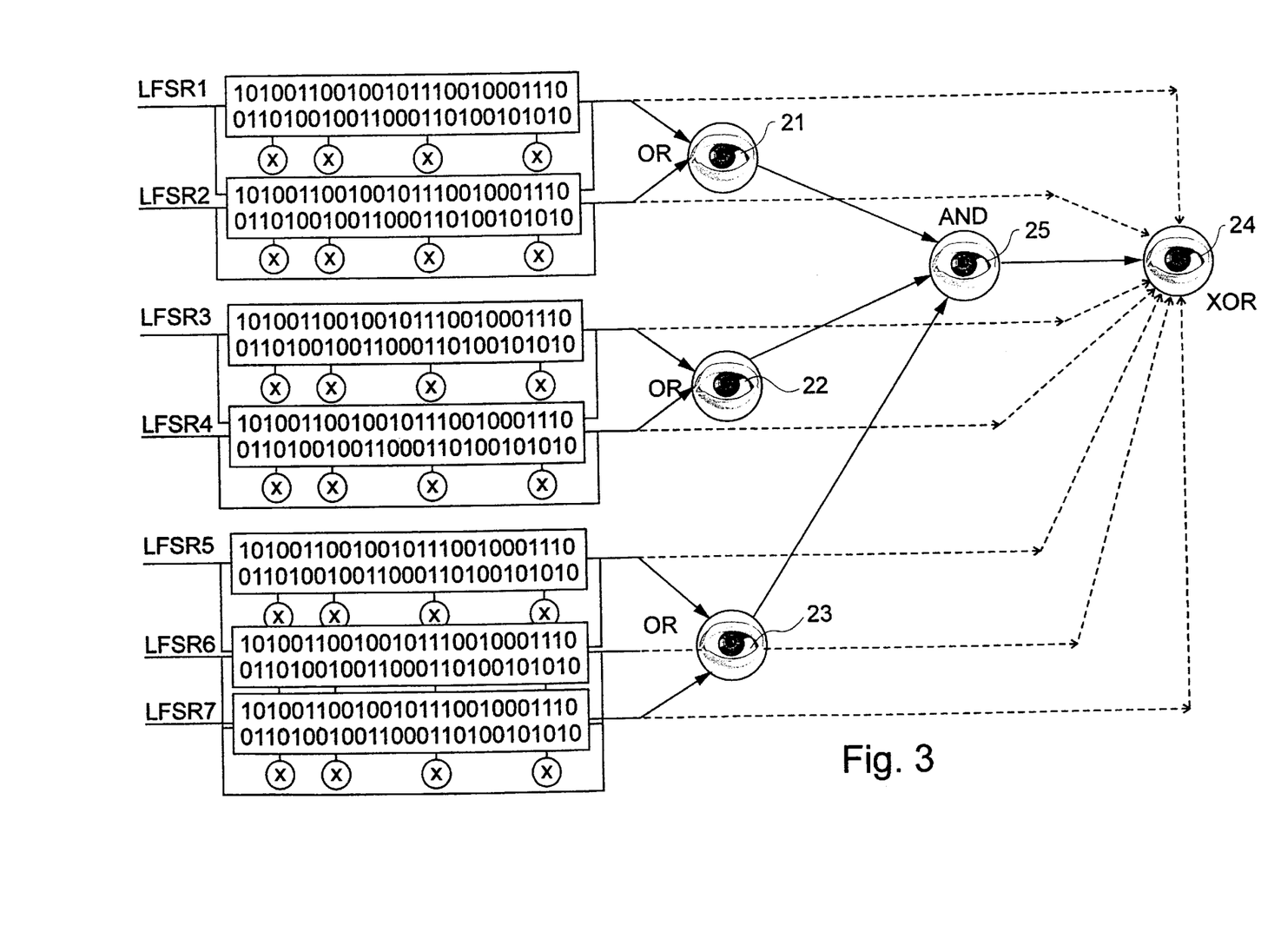
FIG. 3 is a block diagram of a logic element implementing an algorithm for generating a random number.

FIG. 3 shows, by way of example, that the algorithm may be implemented with a plurality of shift registers, which are coupled to a plurality of logic gates. In FIG. 3, seven linear feedback shift registers LFSR1, LFSR2, LFSR3, LFSR4, LFSR5, LFSR6, LFSR7 are shown. These shift registers store the first portion. Each of the linear feedback shift registers is loaded with the bits from the first portion of the block of scrambled data. In FIG. 3, the outputs of the first and second linear feedback shift register LFSR1, LFSR2 are coupled to a first exclusive-OR gate 21. The outputs of the third and fourth linear feedback shift registers LFSR3, LFSR4 are coupled to a second exclusive-OR gate 22. The outputs of the fifth, sixth and seventh linear feedback shift registers LFSR5, LFSR6, LFSR7 are coupled to a third exclusive-OR gate 23. The outputs of the first exclusive-OR gate 21, of the second exclusive-OR gate 22 and of the third exclusive-OR gate 23 are coupled to an AND gate 25. The output of the AND gate 25, and an output of the first linear feedback shift register LFSR1, the second linear feedback shift register LFSR2, the third linear feedback shift register LFSR3, the fourth linear feedback shift register LFSR4, the fifth linear feedback shift register LFSR5, the sixth linear feedback shift register LFSR6, and the seventh linear feedback shift register LFSR7 are coupled to a fourth exclusive-OR gate 24. The random number is present at the output of the fourth exclusive-OR gate 24. The combination of logic elements shown in FIG. 3 is representative, and other combinations may be used to generate a random number.

The steps of the method further include, using the first processor, combining 15 the second portion of the block of scrambled data with the random number to generate a second scrambled portion. The step of combining the second portion of the block of scrambled data with the random number, as illustrated in FIG. 2, may be embodied by exclusive-ORing the second portion of the block of scrambled data with the random number. The common secret number or global key is then combined 16 with the first portion of the block of scrambled data to generate a first scrambled portion. The step of combining 16 the global key with the first portion of the block of scrambled data may be embodied by exclusive-ORing the global key with the first portion of the block of scrambled data. The steps of combining the second portion of the block of scrambled data with the random number and combining the first portion of the block of scrambled data with the global key generate encrypted data. The encrypted data includes the scrambled second portion concatenated with the scrambled first portion. The encrypted data are sent from the first processor to the second processor, typically over a communications channel.

At the second user, using the second processor, the method includes generating the global key from the first public key and the second secret key. Again, the first public key, as with the second public key and all public keys, is assumed to be generally available to the public. The secret key which, in this instance, is the second secret key, is secret to the second user and not known to the other users.

The method includes combining the global key with the scrambled first portion to generate the first portion of the block of scrambled data. The step of combining the global key with the scrambled first portion may be embodied by exclusive-ORing the global key with the scrambled first portion. The method further includes generating the random number from the first portion and combining the random number with the scrambled second portion to generate the second portion of the block of scrambled data. The algorithm used at the first processor to generate the random number from the first portion of the block of scrambled data is used at the second processor. Inserting the first portion of the block of scrambled data into the combination of elements shown in FIG. 3, by way of example, produces the same random number as was produced at the first processor. The step of combining the random number with the scrambled second portion may be embodied by exclusive-ORing the random number with the scrambled second portion. The block of scrambled data, having the first portion and the second portion, is descrambled to generate the block of data.

The present invention also includes a system for encrypting and decrypting data. The data are assumed to have a plurality of blocks. The first user has a first secret key and a first public key; the first public key is generated from the first secret key. The second user has a second secret key and a second public key; the second public key is generated from the second secret key. The system includes a first processor which is located at the first user and a second processor which is located at the second user.

The first processor generates a global key from the second public key and the first secret key. The first processor scrambles and partitions a block of data to generate a block of scrambled data having a first portion and a second portion. The first processor generates a random number, using an algorithm in the first processor, from the first portion of the block of scrambled data. The first processor combines the second portion of the block of scrambled data with a random number to generate a second scrambled portion, and combines the global key with the first portion of the block of scrambled data to generate a first scrambled portion. The resulting encrypted data comprises the scrambled second portion concatenated with the scrambled first portion.

The second processor generates the global key from the first public key and the second secret key. The second processor combines the global key with the scrambled first portion, to generate the first portion. The first portion is not encrypted. The second processor generates the random number from the first portion and combines the random number with the scrambled second portion, to generate the second portion. The first portion is not encrypted. The second processor descrambles the block of scrambled data having the first portion and the second portion, to generate the block of data, which is not scrambled. The first processor may combine the second portion of the block of scrambled data with the random number by exclusive-ORing the second portion of the block of scrambled data with the random number. Similarly, the first processor may combine the global key with the first portion of the block of scrambled data by exclusive-ORing the global key with the first portion of the block of scrambled data.

The second processor may combine the global key with the scrambled first portion by the exclusive-ORing the global key with the scrambled first portion. The second processor also may combine the random number with the scrambled second portion by exclusive-ORing the random number with the scrambled second portion.

Public Key Cryptographic Concepts

Public key cryptographic systems are based on the trap-door one-way function. Consider first, the concept of a one-way function. A one-way function is an easily computed function whose inverse is computationally infeasible to find. That is, for a Y=f(X), given an X, Y is easy to compute. However, given a Y, X is difficult to compute.

The Diffie-Hellman public key cryptographic system is based on exponentiation of number p, in a Galois field, GF(p).

The basic computations for the Diffie-Hellman public key encryption are as follows:

| ENCRYPTION: | $Y = X^E$ modulo p |
|---|---|
| DECRYPTION: | $X = Y^D$ modulo p |

X, Y are integers < p.

where X is the plain-text, Y is the ciphertext, E is the secret encryption exponent and D is the secret decryption exponent.

A key management system based on the work of Diffie-Hellman and Hellman-Pohlig, and independently on the work of Merkle, is two pronged: first, a common secret number is established between two communicators, without either communicator having exchanged any secret information. Second, this common secret number is then used as a key in conventional cryptographic systems, for example, employing the Data Encryption Standard (DES), for enciphering messages.

The security of the Diffie-Hellman system rests on the difficulty of performing discrete logarithms in the finite field, denoted GF(p), of integers modulo p, a very large prime number. A basic conjecture is that exponentiation in GF(p) is a one-way function for a large prime number p. Given integers X and N, the equation $Y=X^N$ modulo p is easy to compute, where $0 \leq X \leq p$. Given Y and X, N is hard to compete in the above equation, because taking a discrete logarithm is computationally hard, $N=\log_X(Y)$, in GF(p). For the best known algorithm for finding discrete logarithms, GF(p), the discrete logarithm on a Cray machine is believed to be impractical to compute when p is a 1000-bit prime number. In contrast, the exponentiation takes a fraction of a second to compute, GF(p). Encryption and decryption are both to be done with exponentiation.

For example, an encryption exponent E and decryption exponent D can be derived using Euler's Theorem from number theory to satisfy $D \cdot E = 1$ modulo (p-1)

This is a necessary relationship for D to be the exponential inverse of E; that is, $(X^E)^D = 1$ modulo p. This relationship can be used to encrypt a message X, an integer less than p, by the exponentiation operation, $Y = X^E$ modulo p and to decrypt this message by another exponentiation operation, $X = Y^D$ modulo p.

Here E and D are kept secret and E can be obtained easily from D and vice versa. Given p, X, and Y satisfying the above two equations, the secret encryption exponent E, for a large prime number p, is computationally difficult to find, due to the difficult problem of taking discrete logarithms in GF(p). For a prime number p of 512 bits, a discrete logarithm is estimated to be many times more difficult to perform than a brute force attack on the DES algorithm.

An important property of the encryption and decryption function based on exponentiation in GF(p) is the commutative property where $(X^{E_1}$ modulo p$)^{E_2}$ modulo p = $(X^{E_2}$ modulo p$)^{E_1}$ modulo p.

This property allows two communicators in a network, hypothetically terminal A and terminal B, to share a secret number by only exchanging non-secret numbers.

Assume the entire network has fixed known constants, not necessarily secret:

p=prime number and a is any integer between 0 and p−1.

For terminal A and terminal B to obtain a shared secret number, terminal A randomly generates a secret number, $X_A$=terminal A's secret number, and computes a corresponding public number, $Y_A = a^{X_A}$ modulo p.

Terminal B also randomly generates a secret number, $X_B$=terminal B's secret number, and computes a corresponding public number, $Y_B = a^{X_B}$ modulo p.

For a large prime number, the secret numbers, for all practical purposes, are impossible to obtain from the public numbers.

Terminal A and terminal B can share a secret number that is unique to them while only exchanging non-secret public numbers. Specifically, suppose terminal A sends his public number, $Y_A$, to terminal B while terminal B sends his public number, $Y_B$, to terminal A. By the commutative property, terminal A can compute $Z = Y_B^{X_A}$ modulo p while terminal B can compute the same number by $Z = Y_A^{X_B}$ modulo p.

Next terminal A and terminal B compute Z*, the reciprocal of Z, such that

Z·Z* = 1 modulo (p−1).

In a particular Diffie-Hellman system the prime number p is chosen to satisfy p = 2q+1 where q is a prime number. Then if Z were an odd integer, then $Z^* = A^{q-2}$ modulo (p−1)

which is another exponentiation. If Z were not an odd number, then terminal A and terminal B first can convert Z to an odd number and then compute Z*.

The shared secret number Z and Z* are used by terminal A and terminal B as a global key to encrypt and decrypt messages where E=Z is the encryption exponent and D=Z* is the decryption exponent. For most encrypted network applications, terminal A and terminal B would exchange encryption keys from conventional encryptors using Z and Z*. This is because encryption with exponentiation may be too slow for most data networks.

For both terminal A and terminal B to contribute independent random bits to the generation of keys may be desirable. For example, terminal A and terminal B can independently generate random bits to form messages which they exchange securely using Z and Z* as shown. The final encryption keys can then be some function of these independently and randomly generated bit sequences such as taking bit by bit modulo 2 addition of the two bit sequences. Another possibility is for terminal A and terminal B to independently generate new secret and public numbers, exchange these public numbers, compute a new shared secret number S, and combine this with the original shared secret number Z to form secret encryption keys.

For example, keys might be of the form M=Z·S modulo p.

RSA System

RSA is a public key encryption technique invented by Rivest, Shamir, and Adleman, and disclosed in U.S. Pat. No. 4,405,829. The security of the RSA system rests on the difficulty of factoring integers into their prime components.

As with the Diffie-Hellman system, encryption and decryption are both done with exponentiation. In the RSA system, however, the modulus is not a prime number as in the Diffie-Hellman technique. Instead, the modulus is a product of two secret prime numbers and, for security, the modulus must be unique to each user in the network.

Using the RSA system, terminal A and terminal B can exchange secret messages by first exchanging non-secret public numbers. Terminal B first randomly generates two large secret prime numbers, ($p_B$, $q_B$)=terminal B's secret prime numbers, a secret decryption exponent, $D_B$=terminal B's secret decryption exponent, and a non-secret public encryption exponent, $E_B$=terminal B's public encryption exponent which satisfies $E_B·D_B = 1$ modulo [$(p_B-1)(q_B-1)$].

In general, to obtain $D_B$ from $E_B$, one would have to know the prime numbers $p_B$ and $q_B$. Hence, without knowledge of terminal B's secret prime numbers, knowing the public encryption exponent $E_B$ does not reveal the decryption exponent $D_B$. In order for the RSA system to be "strong", each of the numbers p−1 and q−1 should have large prime factors.

For terminal A to send a secret message to terminal B, terminal B must send to terminal A his public numbers $N_B = p_B q_B$, and $E_B$.

Then terminal A can send the message X by exponentiation, $Y = X^{E_B}$ modulo $N_B$ Only terminal B can decrypt this message by similar exponentiation with his secret decryption exponent, $X = Y^{D_B}$ modulo $N_B$ In addition, terminal B can send a certified non-secret message M to terminal A by sending, $C = M^{D_B}$ modulo $N_B$ with which terminal A can obtain M from $M = C^{E_B}$ modulo $N_B$ since terminal A knows terminal B's public numbers. In fact, anyone that has terminal B's public numbers can obtain the message M from C. Only terminal B, however, could have computed C from M. Upon converting C to M, terminal A or anyone else who has terminal B's public numbers knows that the message M came from terminal B. Thus, the message M has been signed (authenticated or certified) by terminal B in this procedure. Terminal A also can randomly generate secret prime numbers, ($p_A$, $q_A$)=terminal A's secret prime numbers,
a secret decryption exponent, $D_A$=terminal A's secret decryption exponent,
and a non-secret public encryption exponent, $E_A$=terminal A's public encryption exponent,
which satisfies (using Euler's Theorem)

$E_A D_A = 1$ modulo $[(p_A-1)(q_A-1)]$.

If terminal A and terminal B were to exchange their public numbers then they can exchange secret signed messages in both directions. For a network of encryptors, these secret messages are typically keys for conventional encryptors.

Note that in the RSA technique, every user in the system must have a distinct composite number made up of two large prime numbers; in the Diffie-Hellman technique, by contrast, a single prime number suffices for the entire network. This latter technique simplifies the computations for encryption and decryption since all the users in the network perform their computations modulo a single number, p.

It will be apparent to those skilled in the art that various modifications can be made to the video encryption system and method of the instant invention without departing from the scope or spirit of the invention, and it is intended that the present invention cover modifications and variations of the video encryption system and method provided they come within the scope of the appended claims and their equivalents.

I claim:

1. A method, using a first processor at a first user and a second processor at a second user, for encrypting and decrypting data having a plurality of blocks, with each block having a multiplicity of sub-blocks, with the first user having a first secret key and a first public key generated from the first secret key, and with the second user having a second secret key and a second public key generated from the second secret key, comprising the steps of:

generating, using the first processor, a global key from the second public key and the first secret key;

scrambling, for each block of data, using the first processor, the multiplicity of sub-blocks by exclusive-ORing sequential sub-blocks of the data, and partitioning each block of scrambled data into a first portion and a second portion, thereby generating a block of scrambled data having the first portion and the second portion;

generating a random number, using an algorithm in the first processor, from the first portion of the block of scrambled data;

exclusive-ORing, using the first processor, the second portion of the block of scrambled data with the random number to generate a scrambled second portion and exclusive-ORing, using the first processor, the global key with the first portion of the block of scrambled data to generate a scrambled first portion, thereby generating encrypted data comprising the scrambled second portion concatenated with the scrambled first portion;

sending the encrypted data from the first processor to the second processor;

generating, using the second processor, the global key from the first public key and the second secret key;

exclusive-ORing, using the second processor, the global key with the scrambled first portion, thereby generating the first portion;

generating, using the second processor, the random number from the first portion;

exclusive-ORing, using the second processor, the random number with the scrambled second portion, thereby generating the second portion; and descrambling, at the second processor, the block of scrambled data comprising the first portion and the second portion, thereby generating the block of data.

2. A method, using a first processor at a first user and a second processor at a second user, for encrypting and decrypting data having a plurality of blocks, with the first user having a first secret key and a first public key generated from the first secret key and with the second user having a second secret key and a second public key generated from the second secret key, comprising the steps of:

generating, using the first processor, a global key from the second public key and the first secret key;

scrambling, using the first processor, a block of data;

partitioning the block of scrambled data into a first portion and a second portion, thereby generating a block of scrambled data having the first portion and the second portion;

generating a random number, using an algorithm in the first processor, from the first portion of the block of scrambled data;

combining, using the first processor, the second portion of the block of scrambled data with the random number to generate a scrambled second portion and combining, using the first processor, the global key with the first portion of the block of scrambled data to generate a scrambled first portion, thereby generating encrypted data comprising the scrambled second portion concatenated with the scrambled first portion;

sending the encrypted data from the first processor to the second processor;

generating, using the second processor, the global key from the first public key and the second secret key;

combining, using the second processor, the global key with the scrambled first portion, thereby generating the first portion;

generating, using the second processor, the random number from the first portion;

combining, using the second processor, the random number with the scrambled second portion, thereby generating the second portion; and descrambling, using the second processor, the block of scrambled data comprising the first portion and the second portion, thereby generating the block of data.

3. The method as set forth in claim 2 with the step of combining the second portion of the block of scrambled data with the random number including the step of exclusive-ORing the second portion of the block of scrambled data with the random number.

4. The method as set forth in claim 2 with the step of combining the global key with the first portion of the block of scrambled data including the step of exclusive-ORing the global key with the first portion of the block of scrambled data.

5. The method as set forth in claim 2 with the step of combining the global key with the scrambled first portion including exclusive-ORing the global key with the scrambled first portion.

6. The method as set forth in claim 2 with the step of combining the random number with the scrambled second portion including the step of exclusive-ORing the random number with the scrambled second portion.

7. A method, using a first processor at a first user for encrypting data having a plurality of blocks, with the first user having a global key and with a second user having the global key, comprising the steps of:

scrambling a block of the data and partitioning the block of scrambled data into a first portion and a second portion thereby generating a block of scrambled data having the first portion and the second portion;

generating a random number, using an algorithm, from the first portion of the block of scrambled data;

combining the second portion of the block of scrambled data with the random number to generate a scrambled second portion, and combining the global key with the first portion of the block of scrambled data to generate a scrambled first portion, thereby generating encrypted data comprising the scrambled second portion concatenated with the scrambled first portion.

8. The method as set forth in claim 7 with the step of combining the second portion of the block of scrambled data with the random number including the step of exclusive-ORing the second portion of the block of scrambled data with the random number.

9. The method as set forth in claim 7 with the step of combining the global key with the first portion of the block of scrambled data including the step of exclusive-ORing the global key with the first portion of the block of scrambled data.

10. The method, as set forth in claim 7, further using a second processor at a second user, for decrypting encrypted data having a plurality of blocks, comprising the steps, using the second processor, of:

combining the global key with the scrambled first portion, thereby generating the first portion;

generating the random number from the first portion;

combining the random number with the scrambled second portion, thereby generating the second portion; and descrambling the block of scrambled data comprising the first portion and the second portion, thereby generating the block of data.

11. The method as set forth in claim 10 with the step of combining the global key with the scrambled first portion including exclusive-ORing the global key with the scrambled first portion.

12. The method as set forth in claim 10 with the step of combining the random number with the scrambled second portion including the step of exclusive-ORing the random number with the scrambled second portion.

13. A system for encrypting and decrypting data having a plurality of blocks, with a first user having a first secret key and a first public key generated from the first secret key and with a second user having a second secret key and a second public key generated from the second secret key, comprising:

a first processor, located at the first user, for generating a global key from the second public key and the first secret key, for scrambling and partitioning a block of the data, thereby generating a block of scrambled data having a first portion and a second portion, for generating a random number from the first portion of the scrambled data using an algorithm, for combining the second portion of the block of scrambled data with the random number to generate a scrambled second portion, and for combining the global key with the first portion of the block of scrambled data to generate a scrambled first portion, thereby generating encrypted data comprising the scrambled second portion concatenated with the scrambled first portion; and a second processor located at the second user, for generating the global key from the first public key and the second secret key, for combining the global key with the scrambled first portion, thereby generating the first portion, for generating the random number from the first portion, for combining the random number with the scrambled second portion, thereby generating the second portion, and for descrambling the block of scrambled data having the first portion and the second portion, thereby generating the block of data.

14. The system as set forth in claim 13 with the first processor combining the second portion of the block of scrambled data with the random number by exclusive-ORing the second portion of the block of scrambled data with the random number.

15. The system as set forth in claim 13 with the first processor combining the global key with the first portion of the block of scrambled data by exclusive-ORing the global key with the first portion of the block of scrambled data.

16. The system as set forth in claim 13 with the second processor combining the global key with the scrambled first portion by exclusive-ORing the global key with the scrambled first portion.

17. The system as set forth in claim 13 with the second processor combining the random number with the scrambled second portion by exclusive-ORing the random number with the scrambled second portion.

18. A system for encrypting and decrypting data having a plurality of blocks, with a first user having a first secret key and a first public key generated from the first secret key, and with a second user having a second secret key and a second public key generated from the second secret key, comprising:

first means, located at the first user, for generating a global key from the second public key and the first secret key, said first means for scrambling and partitioning a block of the data, thereby generating a block of scrambled data having a first portion and a second portion, said first means for generating a random number from the first portion of the scrambled data using an algorithm, said first means for combining the second portion of the block of scrambled data with the random number to generate a scrambled second portion, and said first means for combining the global key with the first portion of the block of scrambled data to generate a scrambled first portion, thereby generating encrypted data comprising the scrambled second portion concatenated with the scrambled first portion; and second means located at the second user, for generating the global key from the first public key and the second secret key, said second means for combining the global key with the scrambled first portion, thereby generating the first portion, said second means for generating the random number from the first portion, said second means for combining the random number with the scrambled second portion, thereby generating the second portion, and said second means for descrambling the block of scrambled data having the first portion and the second portion, thereby generating the block of data.

19. The system as set forth in claim 18 with the first means combining the second portion of the block of scrambled data with the random number by exclusive-ORing the second portion of the block of scrambled data with the random number.

20. The system as set forth in claim 18 with the first means combining the global key with the first portion of the block of scrambled data by exclusive-ORing the global key with the first portion of the block of scrambled data.

21. The system as set forth in claim 18 with the second means combining the global key with the scrambled first portion by exclusive-ORing the global key with the scrambled first portion.

22. The system as set forth in claim 18 with the second means combining the random number with the scrambled second portion by exclusive-ORing the random number with the scrambled second portion.

* * * * *